(12) United States Patent
Madrahalli et al.

(10) Patent No.: US 8,045,551 B2
(45) Date of Patent: Oct. 25, 2011

(54) SYSTEMS AND METHODS FOR PRIVATE NETWORK-TO-NETWORK INTERFACE OUT-OF-BAND SIGNALING AND PATH BLOCKING

(75) Inventors: Vagish Madrahalli, Woodstock, GA (US); Nilesh Patil, Atlanta, GA (US); Hongxing Meng, Cumming, GA (US)

(73) Assignee: Ciena Corporation, Linthicum, MD (US)

( * ) Notice: Subject to any disclaimer, the term of this patent is extended or adjusted under 35 U.S.C. 154(b) by 744 days.

(21) Appl. No.: 12/032,773

(22) Filed: Feb. 18, 2008

(65) Prior Publication Data

US 2009/0208206 A1     Aug. 20, 2009

(51) Int. Cl.
*H04L 12/28* (2006.01)
*H04L 12/56* (2006.01)
*H04J 14/00* (2006.01)

(52) U.S. Cl. ........... 370/389; 370/401; 370/410; 398/45

(58) Field of Classification Search .................. None
See application file for complete search history.

(56) References Cited

U.S. PATENT DOCUMENTS

| 7,395,343 | B1 * | 7/2008 | Baker et al. ................... 709/230 |
| 2002/0018269 | A1 * | 2/2002 | Chaudhuri et al. ........... 359/165 |
| 2002/0097745 | A1 * | 7/2002 | Brolin et al. .................. 370/466 |
| 2002/0109879 | A1 * | 8/2002 | Wing So ........................ 359/118 |
| 2004/0105383 | A1 * | 6/2004 | Agrawal et al. ............... 370/228 |
| 2004/0114640 | A1 * | 6/2004 | Bhide et al. .................. 370/907 |

* cited by examiner

*Primary Examiner* — Chirag Shah
*Assistant Examiner* — Srinivasa Reddivalam
(74) *Attorney, Agent, or Firm* — Clements Bernard PLLC; Christopher L. Bernard; Lawrence A. Barratta, Jr.

(57) ABSTRACT

The present invention provides systems and methods to mix In-Band (IB) and Out-of-Band (OOB) signaling mechanisms under the Private Network-to-Network (PNNI) protocol for optical control plane connectivity. The present invention provides mechanisms for establishing and controlling OOB control plane communications. By default, the mechanisms treat all links as IB to discover nodes and links using IB mechanisms. For any blocked links, the link can be configured as OOB if there is a data communication network (DCN) connection to the remote node.

20 Claims, 7 Drawing Sheets

| Type 4 | Length 1 | Version 1 | Line ID 4 | Node Name Length 1 | Node Name X | Label Length 1 | Label-Data X | Continued... |
|---|---|---|---|---|---|---|---|---|

| Link ID 4 | VPCI 1 | Admin State 1 | Concat Type 1 | Link Capability 1 | OOB BW 1 |
|---|---|---|---|---|---|

SYSTEMS AND METHODS FOR PRIVATE NETWORK-TO-NETWORK INTERFACE OUT-OF-BAND SIGNALING AND PATH BLOCKING

FIELD OF THE INVENTION

The present invention relates generally to optical control planes. More particularly, the present invention provides systems and methods for Private Network-to-Network Interface (PNNI) Out-of-Band (OOB) signaling and path blocking for optical control planes allowing a mixture In-Band (IB) and Out-of-Band (OOB) signaling mechanisms under the PNNI protocol.

BACKGROUND OF THE INVENTION

Optical control plane implementations provide automated setup and control of services. Advantageously, control planes offer multi-vendor and inter-domain inter-working, enhanced service offerings such as Ethernet over SONET/SDH or Optical Transport Network (OTN), end-to-end service activation, cross-domain provisioning of switched connection services, service restoration and the like. Traditionally, creating traffic paths through a series of Network Elements (NEs) has involved configuration of individual cross-connects on each NE. Control planes allow a user to specify the start point, end point, and bandwidth required, and an agent on the Network Elements allocates a path through the network, provisioning the traffic path, setting up cross-connects, and allocating bandwidth from the paths for the user requested service. The actual path that the traffic will take through the network is not specified by the user.

Several control plane standards exist including ITU-T Automatically Switched Optical Network (ASON), IETF Generalized Multi-Protocol Label Switching (G-MPLS) also known as Automatic Switched Transport Network (ASTN), and Optical Internetworking Forum (OIF) User-Network Interface Signaling Specifications (UNI) and Inter-Carrier Network Interface Signaling Specification. ASON specifications generally define an optical control plane communication framework. G-MPLS defines control plane discovery, routing, and signaling protocols. OIF UNI/E-NNI specifications define protocol extensions for multi-vendor interoperability.

In traditional networks, an optical control plane communicates through In-Band (IB) signaling, such as using standard SDH/SONET overheads with proprietary protocols to talk between nodes and discover links and exchange topology information. For customer networks who wish to implement control plane technology in regions that are not, or are only partly, served by cable systems that have wavelength access, i.e. without SDH/SONET overheads, control plane communication cannot be achieved through IB signaling. A data communication network (DCN) can be utilized as a general solution to enable control plane functionality on links that terminate the SDH/SONET overheads and provide signaling, such as Private Network-to-Network Interface (PNNI), at places where the IB communication is not possible. The links that are connected through DCN network are referred to as Out-of-Band (OOB) links; normal links with full transparency are referred to as In-Band (IB) links. The new region may have a mixture of OOB and IB links. Disadvantageously, there is no mechanism that is available today to run a single PNNI protocol on a mixture of network nodes where IB and OOB can work concurrently together.

BRIEF SUMMARY OF THE INVENTION

In various exemplary embodiments, the present invention provides systems and methods to mix In-Band (IB) and Out-of-Band (OOB) signaling mechanisms under the PNNI protocol for optical control plane connectivity. The present invention provides mechanisms for establishing and controlling OOB control plane communications. By default, the mechanisms treat all links as IB to discover nodes and links using IB mechanisms. For any blocked links, the link can be configured as OOB if there is a data communication network (DCN) connection to the remote node.

In an exemplary embodiment of the present invention, a method for PNNI out-of-band signaling and blocking includes discovering nodes and links through in-band mechanisms; for all blocked nodes and links in the discovering step, configuring the blocked nodes and links through out-of-band mechanisms; and routing and signaling through a combination of discovered in-band links and configured out-of-band links. The blocked nodes and links include a data communication network connection over which the configuring is performed. The out-of-band mechanisms can include creating a User Datagram Protocol (UDP) socket; binding the UDP socket to an out-of-band port for receiving out-of-band control packets; and configuring a remote node's address and remote link information at both ends of an out-of-band link. Optionally, the out-of-band mechanisms further include, if the out-of-band link is aggregated, identifying individual lines through a Virtual Path Connection Identifier (VPCI). The method for PNNI out-of-band signaling and blocking can further include utilizing mini Hello packets on individual lines with the aggregated out-of-band link to discover if a remote line matches a local line; and declaring the aggregated out-of-band link down if no response is received to a predetermined number of mini-Hello packets. Alternatively, the out-of-band mechanisms further include running mini Hello packets and Hello packets on the out-of-band link. Optionally, the mini Hello packets are configured to discover a remote node, a remote line with a Virtual Path Connection Identifier, a bundle identification, an admin weight, and remote line state information; and the Hello packets are configured to discover remote node, remote link, and aggregated bandwidth information. Alternatively, the method for PNNI out-of-band signaling and blocking further includes raising an alarm if a mismatch is detected at one of a line level and a link level through the mini Hello packets; and performing one of removing a link responsive to the mismatch from routing of decreasing an aggregate bandwidth on a link responsive to the mismatch. The method for PNNI out-of-band signaling and blocking can further include exchanging topology information and performing routing and signaling through the User Datagram Protocol socket. Optionally, the method for PNNI out-of-band signaling and blocking further includes blocking timeslots in routing based on one of intermediate equipment failures and intermediate bandwidth support.

In another exemplary embodiment of the present invention, a node configured for PNNI out-of-band signaling and blocking includes one or more ingress port; one or more egress port; a switch connected to each of the one or more ingress port and the one or more egress port, wherein the switch is configured to provide connectivity between each of the one or more ingress port and the one or more egress port; and a controller operable to control the switch, wherein the controller utilizes a control plane with in-band connections and out-of-band connections to connected nodes for routing and signaling with the connected nodes. The controller is configured to discover connected nodes and links through in-band mechanisms; and for all blocked connected nodes and links, configure the blocked nodes and links through out-of-band mechanisms. The blocked connected nodes and links are connected to the node through a data communication network connection. Optionally, the controller for the out-of-band mechanisms is configured to create a UDP socket; bind the UDP socket to an out-of-band port for receiving out-of-band control packets; and configure the blocked connected node's address and remote link information at both ends of an out-of-band link. Optionally, if the out-of-band link is aggregated, the controller is configured to identify individual lines through a VPCI. The controller can be further configured to utilize mini Hello packets on individual lines with the aggregated out-of-band link to discover if a remote line matches a local line; and declare the aggregated out-of-band link down if no response is received to a predetermined number of mini-Hello packets. Alternatively, the controller is further configured to run mini Hello packets and Hello packets on the out-of-band link; wherein the mini Hello packets are configured to discover a remote node, a remote line with a VPCI, a bundle identification, an admin weight, and remote line state information; and wherein the Hello packets are configured to discover remote node, remote link, and aggregated bandwidth information. Optionally, the controller is further configured to raise an alarm if a mismatch is detected at one of a line level and a link level through the mini Hello packets; and perform one of removing a link responsive to the mismatch from routing of decreasing an aggregate bandwidth on a link responsive to the mismatch. Alternatively, the controller is further configured to exchange topology information and perform routing and signaling through the User Datagram Protocol socket; and block timeslots in routing based on one of intermediate equipment failures and intermediate bandwidth support.

In yet another exemplary embodiment of the present invention, a network with PNNI out-of-band signaling and blocking includes one or more nodes, wherein the one or more nodes are interconnected, and wherein two or more of the one or more nodes are connected by a plurality of in-band links; a data communication network connected between at least two of the one or more nodes, wherein the at least two of the one or more nodes are connected by a plurality of out-of-band links; a control plane utilized between the one or more nodes, wherein the control plane performs routing and signaling over the plurality of in-band links and the plurality of out-of-band links; and a mechanism to discover and manage out-of-band links responsive to path blocking. Optionally, each of the one or more nodes includes an optical switch; the control plane includes an Automatically Switched Optical Network (ASON); and the routing and signaling is performed utilizing Private Network-to-Network Interface (PNNI).

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods to mix In-Band (IB) and Out-of-Band (OOB) signaling mechanisms under the PNNI protocol for optical control plane connectivity. The present invention provides mechanisms for establishing and controlling OOB control plane communications. By default, the mechanisms treat all links as IB to discover nodes and links using IB mechanisms. For any blocked links, the link can be configured as OOB if there is a data communication network (DCN) connection to the remote node.

Additionally, the present invention handles different failure scenarios associated with a DCN and OOB links. Exemplary failure scenarios can include where the data plane on the OOB link is up and DCN network between OOB nodes is down and where only certain timeslots on an OOB link which goes through intermediate equipment may have path defects and which for routing case has to be blocked. Such timeslots are announced in the network topology so that during mesh restoration those timeslots are blocked.

Advantageously, the present invention frees a control plane from network constraints, i.e. as long as the DCN network is available, the control plane can communicate. Additional security can be added at the socket layer without disturbing the protocol providing more security for signaling network topology information. The present invention covers failure scenarios because of network congestion and equipment failures, and generally provides better manageability of the network over conventional mechanisms.

Figure 1:
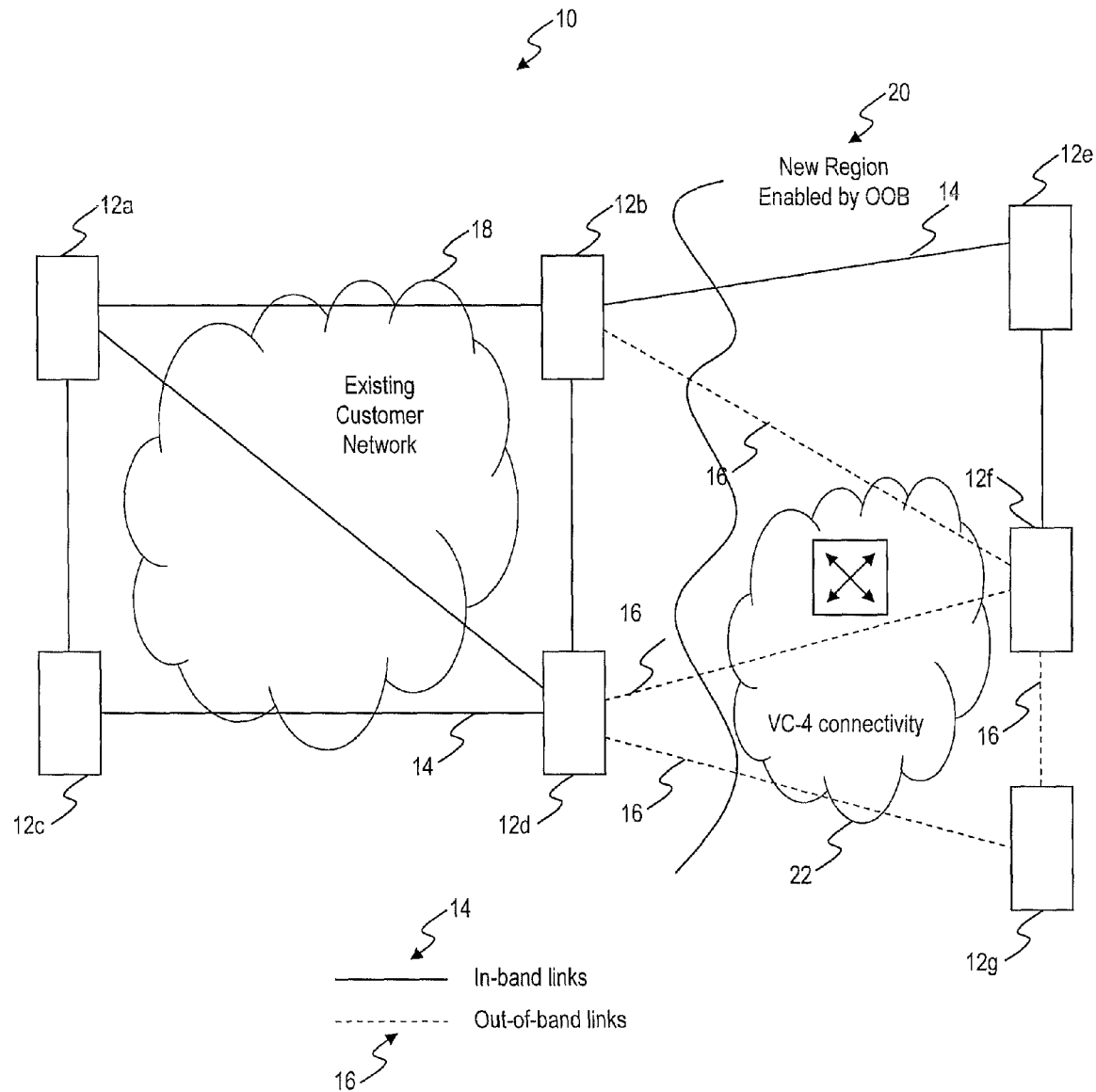
FIG. 1 is a network of multiple interconnected nodes illustrating control plane connectivity through a mixture of In-Band (IB) and Out-of-Band (OOB) links according to an exemplary embodiment of the present invention.

Referring to FIG. 1, a network 10 of multiple interconnected nodes 12a-12g illustrates control plane connectivity through a mixture of IB 14 and OOB 16 links according to an exemplary embodiment of the present invention. The nodes 12a-12e can include optical switches configured to utilize a control plane, such as ASON, for establishing and maintaining connections. Each node 12a-12g includes a plurality of egress and ingress ports to provide interconnection to other nodes. For example, the egress and ingress ports can include optical signals, such as dense wave division multiplexed (DWDM) wavelengths. Each node 12a-12g further includes a switching mechanism configured to provide connectivity between the egress and ingress ports. Each node 12a-12g also includes a controller configured to provide routing and signaling on the control plane. The controller is in communication with each egress and ingress port and is configured to implement the IB and OOB mechanisms described herein.

In this example, the nodes 12a-12d are configured in an existing customer network 18. The nodes 12a-12d utilize IB 14 links for control plane connectivity, i.e. through SONET overhead bytes. For example, the node 12a is connected to nodes 12b, 12c, and 12d. The node 12b is connected to the nodes 12a and 12d, and the node 12c is connected to the nodes 12a and 12d. These connections utilize IB signaling, such as through SONET/SDH/Optical Transport Network (OTN) overhead.

The network 10 includes a new region 20 which is enabled by OOB 16 links. In this example, the new region 20 includes nodes 12e-12g. The node 12e is connected to the node 12b through an IB 14 link and to the node 12f through an IB link 14. The node 12g is connected to the nodes 12f and 12d through as an OOB link 16 through a DCN 22, such as with VC-4 connectivity. The node 12f is also connected through OOB links 16 through the DCN 22 to the nodes 12b, 12d, and 12g.

The present invention provides a mechanism to allow the nodes 12a-12g to utilize both the IB 14 and OOB 16 links using the PNNI protocol. For example, each node 12a-12g is configured to first discover neighboring nodes using IB mechanisms. If any path is blocked to a neighboring node, then the node 12a-12g is configured to provide OOB connectivity as described herein.

Figure 2:
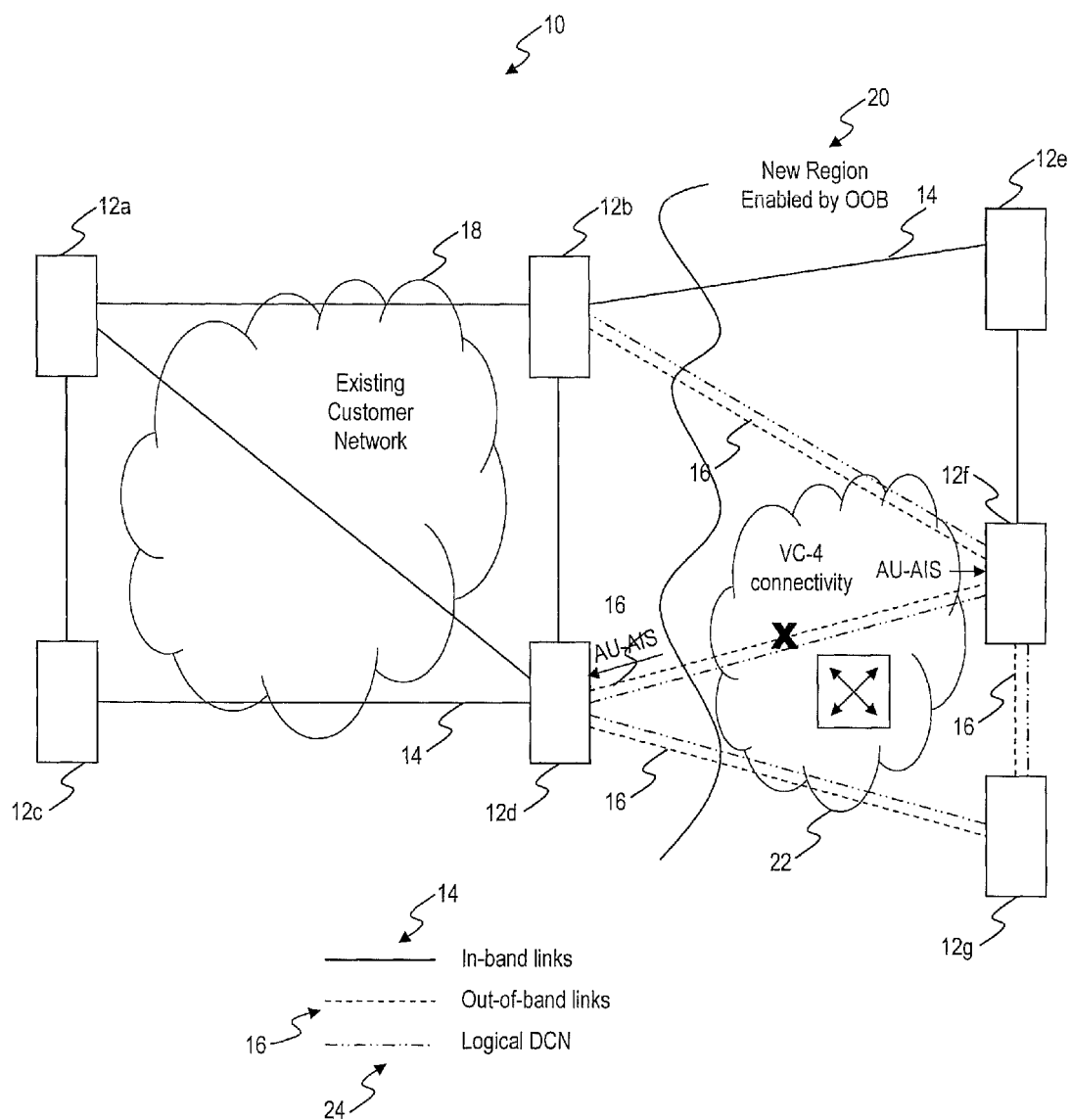
FIG. 2 is the network of FIG. 1 illustrating a failure scenario where the OOB link between two nodes is down but a logical data communication network (DCN) link on the DCN is up according to an exemplary embodiment of the present invention.

Referring to FIG. 2, the network 10 is shown illustrating a failure scenario where the OOB link 16 between the nodes 12d and 12f is down but a logical DCN link 24 on the DCN 22 is up according to an exemplary embodiment of the present invention. Exemplary failure scenarios can include a case where the data plane on the OOB 16 link is up and DCN network between OOB nodes is down. Also there could be case where only certain timeslots on an OOB 16 link which goes through intermediate equipment may have path defects and for which routing has to block that bandwidth. In the example provided, the OOB link 16 between the node 12d and node 12f is receiving an Administrative Unit-Alarm Indication Signal (AU-AIS) indicative of a problem with the link 16. However, the logical DCN link 24 on the DCN 22 between the node 12d and node 12f is up and working.

Figure 3:
FIG. 3 is a mini hello packet used to support complete OOB and IB functionality according to an exemplary embodiment of the present invention.

For OOB link 16 configurations, the present invention, by default, user has to provide the OOB port information. This can be limited to one per node to avoid scaling issues. This allows multiple OOB links 16 from different nodes to talk to the same port on the local node. Initially when the node 12a-12g comes up (if the OOB links 16 are not yet configured), then OOB links 16 are treated as unknown links. After the user configuration of the remote node's Internet Protocol (IP) address and remote link information at both ends of the OOB link 16, a mini Hello packet as described in FIG. 3 is sent out to discover and validate the information. Also if the link is aggregated, then individual lines are identified based on a Virtual Path Connection Identifier (VPCI) and these are sent as part of the routing packet to identify the remote link's aggregated line information. Note that in case of aggregation, separate lines will be used for sending routing packets and signaling packets. This allows separation of signaling and routing bandwidth usage and minimizes the failure impacts.

OOB links 16 are also configurable for announcing in routing "maximum bandwidth for individual cross connects" that this link 16 can support based on intermediate equipments ability to do standard concatenation. This allows any type of link to manage the connections based on the connected equipment. This can indicate to the originating node, the connection that can go through this link based on the bandwidth availability.

Referring to FIG. 3, a mini Hello packet 40 is used to support complete OOB functionality according to an exemplary embodiment of the present invention. The mini Hello packet 40 can be exchanged between nodes 12 over a DCN 22 for OOB links 16 and over IB links 14. FIG. 3 illustrates a format of the mini Hello packet 40. The mini Hello packet 40 runs on individual physical lines.

The mini Hello packet 40 runs on individual physical lines, i.e. on each Optical Signal and Routing Protocol (OSRP) line. It is used to inform the remote end of an OSRP line about the local configuration information, i.e. OSRP line ID, CD name, OSRP line label, OSRP link ID, Standard and Transparent Concatenation, VPCI and admin state. Depending on the information received, the receiving end decides whether the configuration of the OSRP line and link is correct or not. In case a misconfiguration is detected, an alarm is raised to indicate this and the bandwidth on that line is set to zero. A Hello packet can run on links which could be an aggregation of lines. If a link has more than one physical line aggregated, then each line will be used for sending the mini Hello packet 40.

The mini hello packet 40 includes:

| | |
|---|---|
| Type | Mini Hello packet type |
| Length | Packet length |
| Version | The current version of the OSRP Hello protocol being used for communication with this neighbor. If no acceptable version number has been derived, this field will be zero. |
| Line ID | Identification of the line for the Mini Hello packet |
| Node Name length | Length of the node name |
| Node Name | An identifier that uniquely identifies the node in the routing domain. This is assigned during node initialization and cannot be changed while the node is operational (i.e. while the node has any adjacencies, hello FSMs in any state other than down, or any topology database entries). |
| Label Length | Length of the label |
| Port ID | An identifier that uniquely identifies the physical port on the node described by the hello data structure. This value is assigned by the node and has only local significance. |
| Remote Node ID | The Node ID of the neighbor node on the other end of the link. The Remote Node ID is obtained when Hello messages are received from the neighbor. |
| Multiple Bundle IDs | The protection bundle IDs of the link. Multiple bundle IDs are exchanged in Hello messages by both neighbors |
| Link Capability | This contains link capabilities including OOB information (Link, VPCI and BW) so that all the nodes in the network know about this link's capabilities. |

On the DCN 22, each Node 12 creates a User Datagram Protocol (UDP) socket and binds to this OOB Port to receive OOB control packets. Mini Hello Protocol is run on individual lines within a link to discover if the remote line matches the local line. There can be mismatches at aggregation (link or node level), standard concatenation difference, VPCI mismatch, admin state mismatch, etc. Accordingly, an alarm is raised at line level responsive to mismatches. Note that this line is not selected for traffic selection in case of alarms. Link mismatches like admin weight mismatch, bundle id mismatch are also detected and in case of a mismatch, alarm is raised on the link and that link is taken out of routing. Once the line and its contained link is OK (i.e. without any alarms), the link is created in PNNI and PNNI runs on these links and is transparent to the underneath communication mechanism. It sends initial hello messages on this OOB link 16 and discovers the remote node 12 and remote link 16 and also gets the network topology information through Database summary message exchange.

Figure 4:
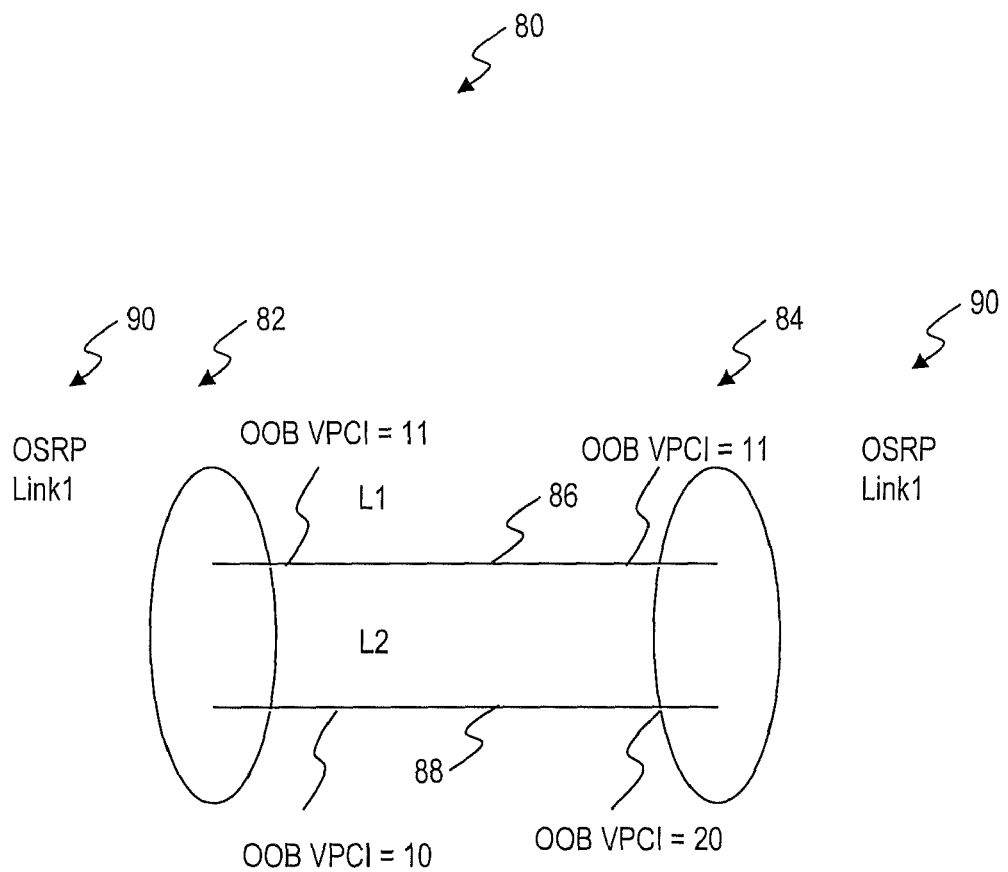
FIG. 4 is a diagram of a typical configuration mismatch detection for OOB VPCI, Node ID, Bundle ID, Admin Weight according to an exemplary embodiment of the present invention.

Referring to FIG. 4, a typical mismatch detection 80 for OOB VPCI or concatenation mismatch is illustrated according to an exemplary embodiment of the present invention. The mismatch detection 80 is shown between two nodes 82, 84. The nodes 82, 84 are shown connected by two lines 86, 88 forming an OSRP link 90. Line 86 has both ends matching OOB VPCI. In case of line 88, it has a mismatch (with one side as 10 and other side as 20). In this case as the VPCI at both end points do not match, this line gets alarmed. Same way any mismatch related to configured attributes like bundle id, admin weight, standard concatenation, transparent concatenation can result in this alarm state.

The present invention generates alarms is generated on an OSRP link when the OOB VPCI or OOB bandwidth configuration on local node does not match that on neighbor node. For example, in FIG. 4, the mismatch detection 80 shows an OOB VPCI=10 at node 82 and an OOB VPCI=20 at node 84 which is a mismatch resulting in an alarm. When cleared, this alarm is cleared on the OSRP link 90 on both nodes 82, 84. The alarm is cleared when the OSRP link's 90 remote OOB parameters and local link's 90 OOB parameters match, and when the OSRP link's 90 operational state is disabled, that means in this OSRP link 90, all the lines 86, 88 are either in administrative lock state or in down state.

While in the alarmed state, the existing SNCs are not released but no new SNCs are allowed to be created. Also note that this line is taken out of routing by advertising its bandwidth as 0.

The link 90 is declared as unreachable and treated as if the control plane reachability is declared as down if a neighboring node (i.e., node 84 to node 82, node 82 to node 84) does not respond within three or another predetermined number of mini Hello timeouts. During this time, this link/line 90/86, 88 is taken out of routing. Note that in case of multiple OOB links 90, underneath communication stream identifies the packets by remote and local links to distinguish an individual packet per link.

Figure 5:
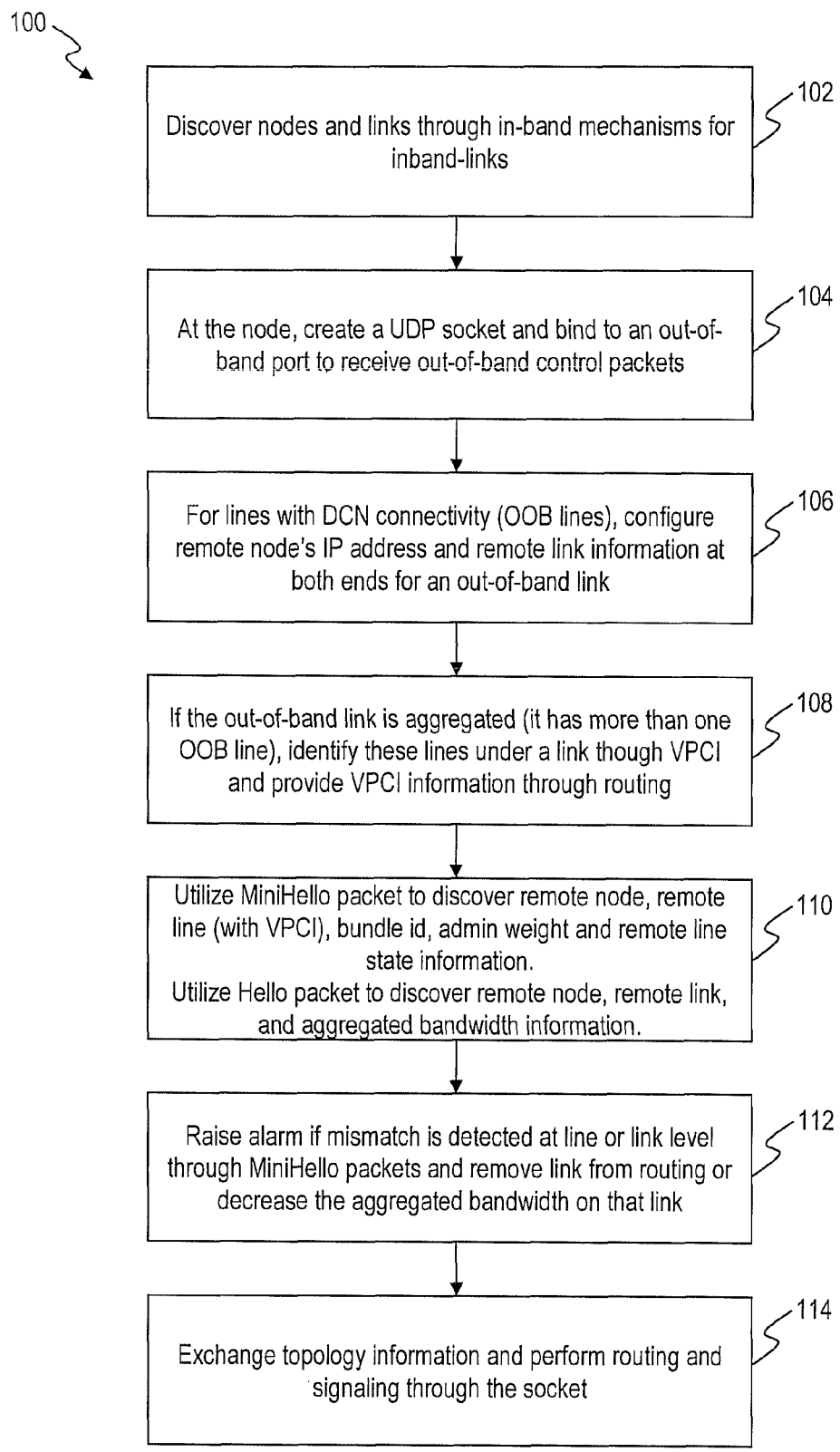
FIG. 5 is a flowchart of a mechanism for OOB PNNI and path blocking according to an exemplary embodiment of the present invention.

Referring to FIG. 5, a flowchart illustrates a mechanism 100 for OOB PNNI and path blocking according to an exemplary embodiment of the present invention. The mechanism 100 for OOB PNNI and path blocking can be implemented on each node in a network using PNNI signaling and routing, such as an optical switch or the like. First, a node discovers all nodes and their in band links through in-band (IB) mechanisms (step 102). This is again by running mini Hello on IB links and then after discovering the adjacent nodes, running Hello through PNNI routing. If any links are blocked, then the mechanism 100 continues to provision these blocked links through OOB mechanisms in steps 104-114.

At each node, a user can specify a UDP socket that has to be created for OOB DCN communication. The node creates the socket and the socket is used for sending and receiving OOB control packets (step 104). For all OOB links with DCN connectivity, the user has to configure the remote node's IP address and remote link information at both ends for an OOB link (step 106).

If the OOB link is aggregated, the individual lines are identified through VPCI and the VPCI information is provided to other nodes through routing (step 108). As described herein, this allows a particular link to use separate lines for sending signaling and routing packets and this increases signaling and routing resiliency. The mechanism 100 utilizes mini Hello packets to discover remote nodes, remote lines (with VPCI), bundle identification, administrative weight, and remote line state information. The mechanism 100 utilizes Hello packets to discover remote nodes, remotes links, and aggregated bandwidth information (step 110).

The node utilizes mini Hello packets, such as described in FIG. 3, on individual lines within a link to discover if a remote line matches a local line, i.e. bandwidth, VPCI information, etc. An alarm is raised if a mismatch is detect at a line or link levels through the mini Hello packets, and the link is removed from routing or the aggregate bandwidth on that link is decreased (step 112). Additionally, the node can declare the link/line down if no response is received to a predetermined number (e.g., three) of mini hello packets.

Once remote node and links are discovered, topology information is exchanged and routing is performed through the socket (step 114). The maximum size of the UDP packet is bound by the maximum size of the signaling and routing of PNNI packets. Any new signaling message (setup/connect/release) is handled through this socket for communicating to the remote DCN node in case if this OOB link is chosen for carrying traffic.

Routing also happens through this socket. In case if this OOB line's data plane detects failures, then the link associated with this OOB line blocks these timeslots based on bandwidth and updates its routing database and publishes this information to neighbor nodes so that originating node is going to block this link while setting up new path or during mesh restoration. Once the fault clears, same procedure is repeated with another update with unblocked information indicating that these timeslots or link in use.

Out of Band link type is announced in the routing so that the neighbor nodes can use this link in their path computation based on customer requirements. For example, if they do not want to setup high priority connections on that line or if they want to setup only certain sized connections on that line (because of intermediate equipment restriction), then originating node can pass this constraint into its path computation algorithm to get an optimal path.

Figure 6:
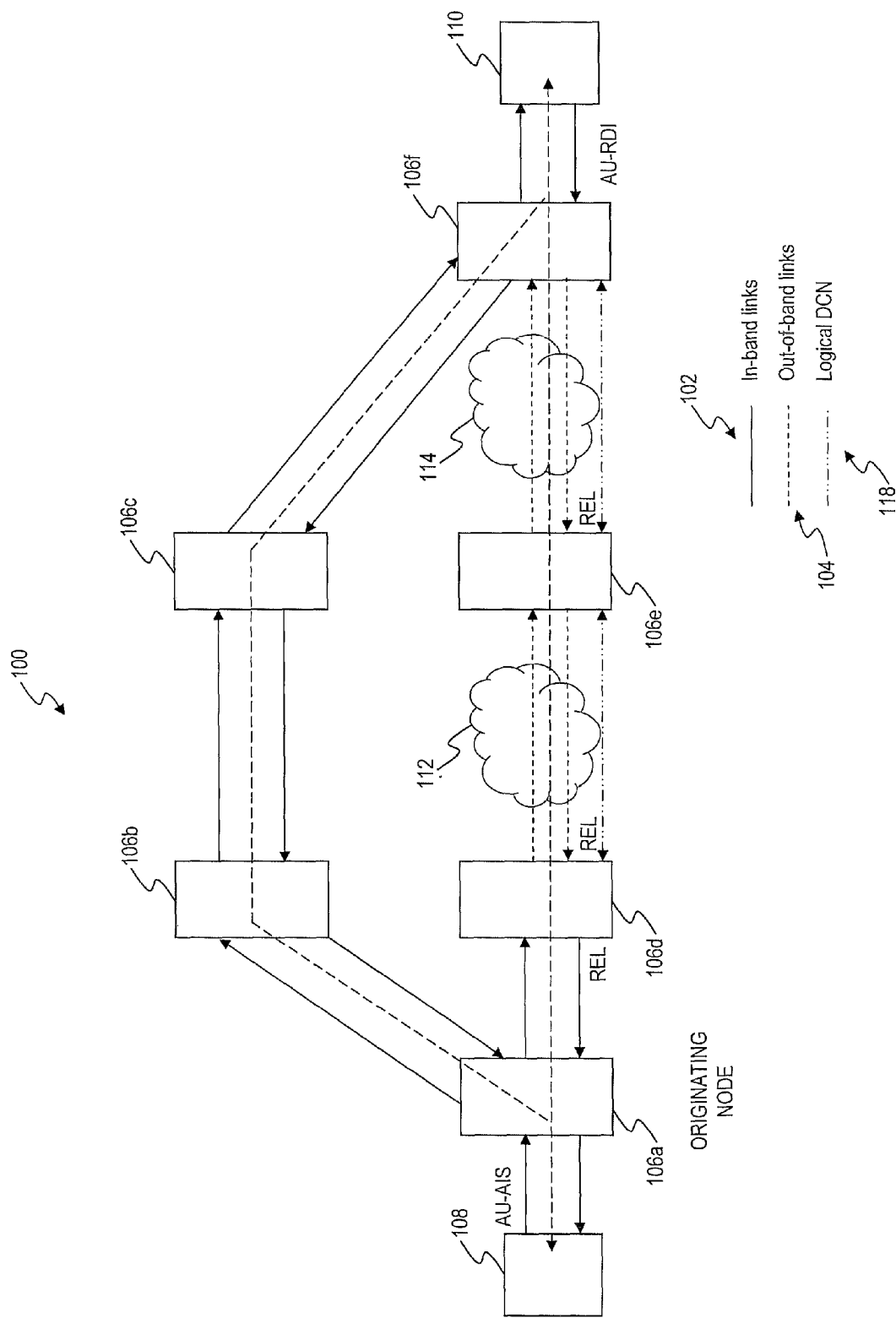
FIGS. 6 and 7 are diagrams of a network with IB links and OOB links between multiple nodes illustrating failure scenarios according to an exemplary embodiment of the present invention.
Figure 7:
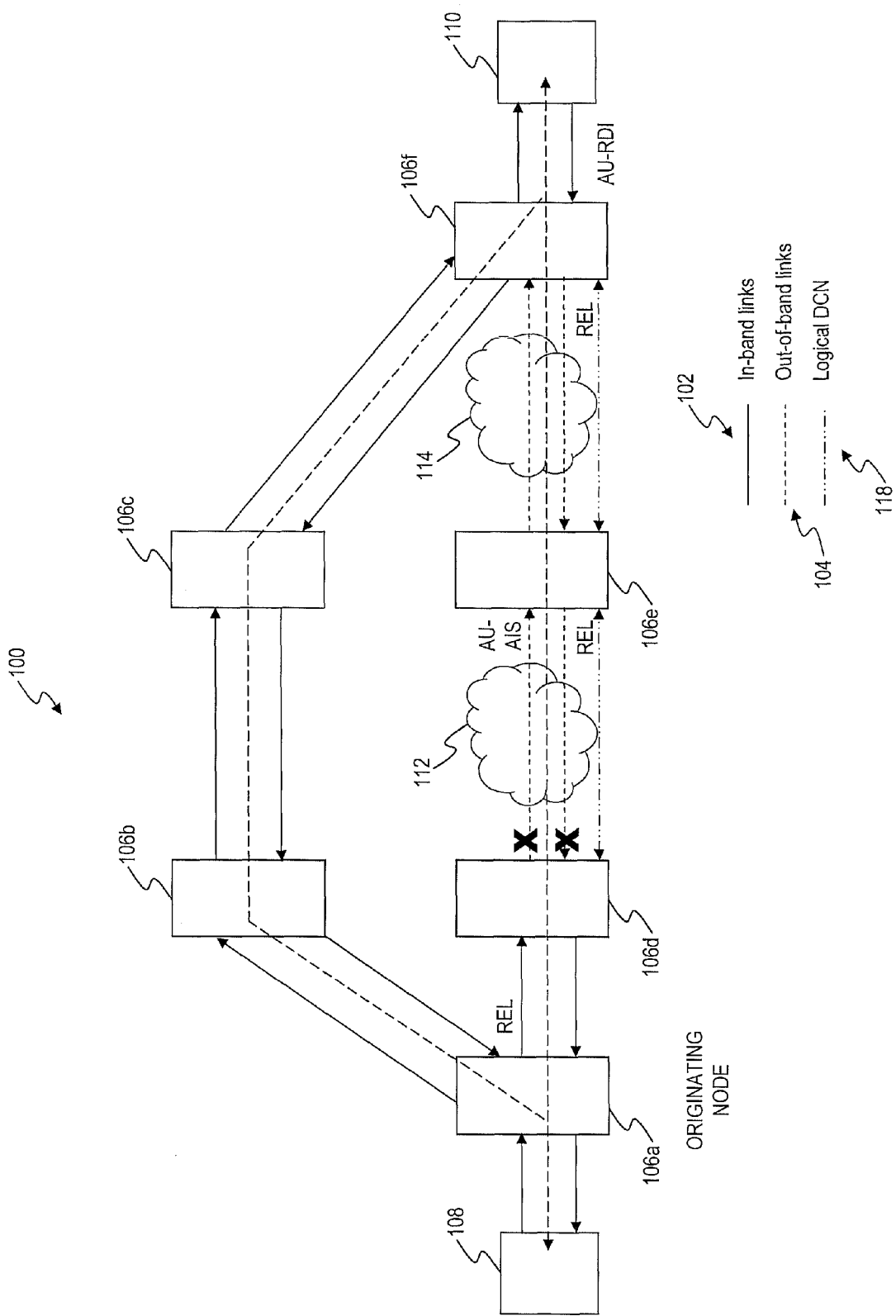

Referring to FIGS. 6 and 7, a network 100 with IB links 102 and OOB links 104 between multiple nodes 106a-106f illustrates failure scenarios according to an exemplary embodiment of the present invention. The network 100 includes two clients 108, 110 connected to the nodes 106a-106f. The client 108 is connected to the node 106a, and the client 110 is connected to the node 106f. The clients 108, 110 can communicate using O-NNI to the nodes 106a, 106f. The network 100 includes a DCN 112 between nodes 106d and 106e and a DCN 114 between nodes 106e and 106f. The network 100 includes IN links 103 between nodes 106a-106d and node 106f. Node 106e is connected to the network 100 through OOB links 104 over the DCNs 112, 114 to form a logical DCN link 116*b*. Then an connection request from an client can come to the network via O-NNI link and transparently this message is transmitted to the destination client via PNNI. The control path for signaling could be a mixture of in band and OOB lines and traffic can be part of both these lines.

According to an exemplary embodiment of the present invention, the various nodes 106*a*-106*f* can be configured to discover the IB links 102 and OOB links 104 using the mechanisms described herein, such as in FIG. 5. For example, node 106*a* discovers IB links 102 to nodes 106*b* and 106*d*. The node 106*d* discovers an IB link 102 to node 102*a*, but finds a blocked link to node 106*e*. Accordingly, the node 106*d* utilizes OOB discovery mechanisms to discover and provision the OOB link 104 over the DCN 112 to the node 102*e*.

Whenever an OOB link 104 is configured, a SONET/SDH subsystem starts monitoring all the timeslots for those individual lines (or single line in case of no aggregation) under this link 104. In normal scenarios, UNEQ (unequipped) is seen on those timeslots in case if there is no circuit provisioning. If there are failures as discussed below, this triggers routing to block the line or timeslots and in turn results in routing updates for that link 104. Note that in case of an aggregated link 104, line selection could be done local to this node, but the overall bandwidth or maximum size of the connection is reduced by the standard concatenation size of the connection supported by the intermediate equipment. The failures, line level and path level, detected by hardware are aggregated to reflect the path state according policy and soaked for a configurable time. For example, the present invention can recognize line level failures, such as AIS-L (alarm indication signal-line), RDI-L (remote defect indicator-line), and local/remote hardware failures, and path level failures, such as AIS-P (alarm indication signal-path), RDI-P (remote defect indicator-path).

FIG. 6 illustrates a failure caused on a single connection by AIS-P at the originating node 106*a*, resulting in release of that particular connection. At that point RDI-P is received on the remote OOB node 106*f* through data plane and a connection release signaling message is received through the DCNs 112, 114. FIG. 7 illustrates a failure on the DCN 112 along with an RDI-P. This results in release (REL) not reaching the next hop node, but the originating node 106*a* detects the AIS-P resulting in mesh restoring the connection. A new connection bumps off the old connection on the terminating node 106*f* in case if the release did not make it to the terminating node 106*f*.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for PNNI out-of-band signaling and blocking, comprising:
    discovering nodes and links through in-band mechanisms, wherein each of the nodes is configured to first perform the discovering step through the in-band mechanisms;
    for all blocked nodes and links in the discovering step, configuring the blocked nodes and links through out-of-band mechanisms; and
    routing and signaling using PNNI through a combination of discovered in-band links and configured out-of-band links transparent to a communication mechanism of the discovered in-band links and the configured out-of-band links;
    wherein the discovered in-band links and configured out-of-band links comprise a unified control plane, and wherein a node linked to a prior node via an in-band link in the control plane and terminating the in-band link is linked to a subsequent node via an out-of-band link in the control plane.

2. The method for PNNI out-of-band signaling and blocking of claim 1, wherein the blocked nodes and links comprise a data communication network connection over which the configuring is performed.

3. The method for PNNI out-of-band signaling and blocking of claim 2, wherein the out-of-band mechanisms comprise:
    creating a User Datagram Protocol socket;
    binding the User Datagram Protocol socket to an out-of-band port for receiving out-of-band control packets; and
    configuring a remote node's address and remote link information at both ends of an out-of-band link.

4. The method for PNNI out-of-band signaling and blocking of claim 3, wherein the out-of-band mechanisms further comprise, if the out-of-band link is aggregated, identifying individual lines through a Virtual Path Connection Identifier.

5. The method for PNNI out-of-band signaling and blocking of claim 4, further comprising:
    utilizing mini Hello packets on individual lines with the aggregated out-of-band link to discover if a remote line matches a local line; and
    declaring the aggregated out-of-band link down if no response is received to a predetermined number of mini-Hello packets.

6. The method for PNNI out-of-band signaling and blocking of claim 3, wherein the out-of-band mechanisms further comprise running mini Hello packets and Hello packets on the out-of-band link.

7. The method for PNNI out-of-band signaling and blocking of claim 6, wherein the mini Hello packets are configured to discover a remote node, a remote line with a Virtual Path Connection Identifier, a bundle identification, an admin weight, and remote line state information; and
    wherein the Hello packets are configured to discover remote node, remote link, and aggregated bandwidth information.

8. The method for PNNI out-of-band signaling and blocking of claim 6, further comprising:
    raising an alarm if a mismatch is detected at one of a line level and a link level through the mini Hello packets; and
    performing one of removing a link responsive to the mismatch from routing or decreasing an aggregate bandwidth on a link responsive to the mismatch.

9. The method for PNNI out-of-band signaling and blocking of claim 3, further comprising exchanging topology information and performing routing and signaling through the User Datagram Protocol socket.

10. The method for PNNI out-of-band signaling and blocking of claim 1, further comprising blocking timeslots in routing based on one of intermediate equipment failures and intermediate bandwidth support.

11. A node configured for PNNI out-of-band signaling and blocking, comprising:
    one or more ingress port;
    one or more egress port;
    a switch connected to each of the one or more ingress port and the one or more egress port, wherein the switch is configured to provide connectivity between each of the one or more ingress port and the one or more egress port; and a controller operable to control the switch, wherein the controller utilizes a PNNI control plane with in-band connections and out-of-band connections to connected nodes for routing and signaling with the connected nodes, and wherein the controller is configured to:

discover connected nodes and links through in-band mechanisms, wherein each of the connected nodes is configured to first perform the discovering through the in-band mechanisms; and for all blocked connected nodes and links, configure the blocked nodes and links through out-of-band mechanisms;

wherein discovered in-band links and configured out-of-band links comprise a unified control plane, and wherein a node linked to a prior node via an in-band link in the control plane and terminating the in-band link is linked to a subsequent node via an out-of-band link in the control plane.

12. The node configured for PNNI out-of-band signaling and blocking of claim 11, wherein the blocked connected nodes and links are connected to the node through a data communication network connection.

13. The node configured for PNNI out-of-band signaling and blocking of claim 12, wherein the controller for the out-of-band mechanisms is configured to:

create a User Datagram Protocol socket;

bind the User Datagram Protocol socket to an out-of-band port for receiving out-of-band control packets; and configure the blocked connected node's address and remote link information at both ends of an out-of-band link.

14. The node configured for PNNI out-of-band signaling and blocking of claim 13, wherein, if the out-of-band link is aggregated, the controller is configured to identify individual lines through a Virtual Path Connection Identifier.

15. The node configured for PNNI out-of-band signaling and blocking of claim 14, wherein the controller is further configured to:

utilize mini Hello packets on individual lines with the aggregated out-of-band link to discover if a remote line matches a local line; and declare the aggregated out-of-band link down if no response is received to a predetermined number of mini-Hello packets.

16. The node configured for PNNI out-of-band signaling and blocking of claim 13, wherein the controller is further configured to run mini Hello packets and Hello packets on the out-of-band link;

wherein the mini Hello packets are configured to discover a remote node, a remote line with a Virtual Path Connection Identifier, a bundle identification, an admin weight, and remote line state information; and wherein the Hello packets are configured to discover remote node, remote link, and aggregated bandwidth information.

17. The node configured for PNNI out-of-band signaling and blocking of claim 16, wherein the controller is further configured to:

raise an alarm if a mismatch is detected at one of a line level and a link level through the mini Hello packets; and perform one of removing a link responsive to the mismatch from routing or decreasing an aggregate bandwidth on a link responsive to the mismatch.

18. The node configured for PNNI out-of-band signaling and blocking of claim 13, wherein the controller is further configured to:

exchange topology information and perform routing and signaling through the User Datagram Protocol socket; and block timeslots in routing based on one of intermediate equipment failures and intermediate bandwidth support.

19. A network with PNNI out-of-band signaling and blocking, comprising:

one or more nodes, wherein the one or more nodes are interconnected, and wherein two or more of the one or more nodes are connected by a plurality of in-band links;

a data communication network connected between at least two of the one or more nodes, wherein the at least two of the one or more nodes are connected by a plurality of out-of-band links;

a PNNI control plane utilized between the one or more nodes, wherein the control plane performs routing and signaling over the plurality of in-band links and the plurality of out-of-band links; and a mechanism to discover and manage out-of-band links responsive to path blocking, wherein each of the one or more nodes is configured to first attempt the discovering through in-band mechanisms and to second attempt the discovering through out-of-band mechanisms responsive to the path blocking;

wherein discovered in-band links and out-of-band links comprise a unified control plane, and wherein a node linked to a prior node via an in-band link in the control plane and terminating the in-band link is linked to a subsequent node via an out-of-band link in the control plane.

20. The network with PNNI out-of-band signaling and blocking of claim 19, wherein each of the one or more nodes comprises an optical switch;

wherein the control plane comprises an Automatically Switched Optical Network (ASON); and wherein the routing and signaling is performed utilizing Private Network-to-Network Interface (PNNI).

* * * * *